United States Patent
Shah et al.

(10) Patent No.: US 8,407,779 B1
(45) Date of Patent: Mar. 26, 2013

(54) TRANSPOSING A PACKET FIREWALL POLICY WITHIN A NODE

(75) Inventors: Sandip Shah, Milpitas, CA (US); Apoorva Jindal, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 58 days.

(21) Appl. No.: 13/193,782

(22) Filed: Jul. 29, 2011

(51) Int. Cl.
*G06F 15/00* (2006.01)
*H04L 29/06* (2006.01)

(52) U.S. Cl. .......................................... 726/13; 713/150
(58) Field of Classification Search ............ 726/13; 713/150
See application file for complete search history.

(56) References Cited

U.S. PATENT DOCUMENTS

| | | | |
|---|---|---|---|
| 6,944,777 B1 * | 9/2005 | Belani et al. | 713/150 |
| 7,529,760 B2 * | 5/2009 | Jennery | 1/1 |
| 2002/0138631 A1 * | 9/2002 | Friedel et al. | 709/229 |
| 2004/0034618 A1 * | 2/2004 | Lu et al. | 707/1 |
| 2006/0143449 A1 * | 6/2006 | Groger et al. | 713/166 |
| 2006/0168257 A1 * | 7/2006 | Friedel et al. | 709/229 |
| 2006/0288409 A1 * | 12/2006 | Bartal et al. | 726/11 |
| 2007/0028297 A1 * | 2/2007 | Troyansky et al. | 726/2 |
| 2008/0301780 A1 * | 12/2008 | Ellison et al. | 726/4 |
| 2009/0138960 A1 * | 5/2009 | Felty et al. | 726/14 |
| 2009/0271857 A1 * | 10/2009 | Wang et al. | 726/11 |
| 2010/0011027 A1 * | 1/2010 | Cox et al. | 707/200 |
| 2010/0017868 A1 * | 1/2010 | Hao et al. | 726/11 |
| 2010/0161526 A1 * | 6/2010 | Zhang et al. | 706/12 |
| 2010/0179936 A1 * | 7/2010 | Jeremiah | 706/50 |
| 2011/0164747 A1 * | 7/2011 | Junod et al. | 380/210 |

* cited by examiner

*Primary Examiner* — Techane Gergiso
(74) *Attorney, Agent, or Firm* — Harrity & Harrity, LLP

(57) ABSTRACT

A system is configured to receive a set of rules that specify how packets are to be processed by a node, where the set of rules include one or more negative rules that identify operations to be performed, by the node, when information associated with the packets does not match information specified by the negative rules, and one or more positive rules that identify other operations to be performed, by the node, when the information associated with the packets matches information specified by the positive rules. The system is also configured to create a group of modified rules by converting the negative rules into a corresponding group of positive rules; and install the modified rules in the node that allows the node to process the packets, using the modified rules, as though the node was processing the packets using the set of rules.

12 Claims, 8 Drawing Sheets

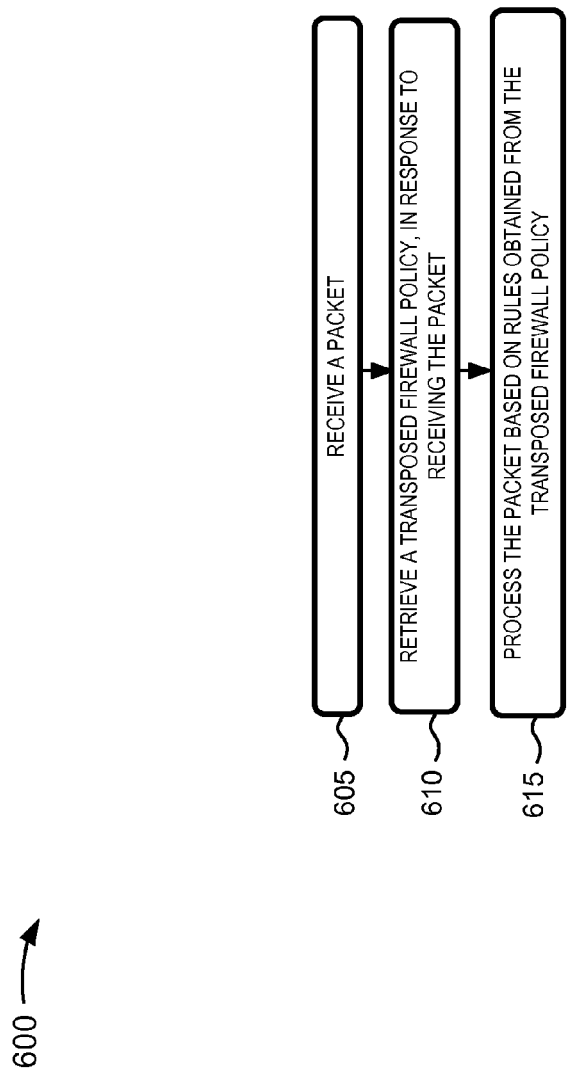

TRANSPOSING A PACKET FIREWALL POLICY WITHIN A NODE

BACKGROUND

Computation and communication networks typically include nodes, such as routers, firewalls, switches or gateways, which transfer or switch data, such as packets, from one or more sources to one or more destinations. The nodes may operate on the packets as the packets traverse the network, such as by forwarding or filtering the packet-based network traffic.

Nodes, such as firewalls, gateways, etc., may permit or deny transmission of packets through a network. The nodes may determine whether to permit or deny the transmission of the packets based on policies and/or rules that identify conditions that are to be satisfied before the packets can be transmitted. Some nodes may include components, such as ternary content addressable memories (TCAMs) and/or other components, that cannot process and/or execute rules that are based on negative conditions. A negative condition may, for example, identify an action that is to be performed, by a node, when a condition is deemed not to be present (e.g., when a source address, obtained from a packet, is identified as not being a particular address). Nodes that cannot execute and/or process negative conditions may reduce a degree of flexibility by which nodes can process packets.

SUMMARY

According to one aspect, a method, performed by a device, may include receiving a set of rules, associated with a policy, that specify how packets are to be processed by a node. The set of rules may include one or more negative rules that identify operations to be performed, by the node, when information, obtained from the packets, does not match information specified by the one or more negative rules, and one or more positive rules that identify other operations to be performed, by the node, when the information, obtained from the packets, matches information specified by the one or more positive rules. The method may also include creating a plurality of modified rules by converting the one or more negative rules into a corresponding one or more positive rules; and installing the set of modified rules in the node that may allow the node to process the packets, using the set of modified rules, as though the node was processing the packets using the set of rules.

According to another aspect, a device may include one or more processors to receive a set of rules, associated with a policy, that specify a manner in which packets are to be processed by a node. The device may also include the one or more processors to classify the set of rules to identify one or more negative rules and one or more positive rules, where each of the one or more negative rules may include a respective negative term that identifies an operation to be performed, on the packets, when information, obtained from the packets, does not match a condition identified by the respective negative term, and where the one or more positive rules may identify other operations to be performed, by the node, when the information, obtained from the packets, matches conditions specified by the one or more positive rules. The device may further include the one or more processors to process the set of rules to create a set of positive rules, the set of positive rules being based on the one or more positive rules and a modified version of each of the respective negative terms; and install the set of positive rules, in the node, that may allow the node to process the packets as though the node was processing the packets using the set of rules.

According to still another aspect, a non-transitory computer-readable medium, containing one or more instructions executable by at least one processor, may include one or more instructions to receive a set of rules, associated with a policy that specifies how packets are to be processed by a node, where the plurality of rules may include one or more negative rules, and where the one or more negative rules may identify operations to be performed, by the node, when information associated with the packets does not match information specified by the one or more negative rules. The computer-readable medium may also include one or more instructions to create a group of modified rules by converting the one or more negative rules into a corresponding set of positive rules, where the one or more instructions to create the group of modified rules includes converting the one or more negative terms to one or more positive terms; and one or more instructions to transmit the set of modified rules, to the node, that allows the node to process the packets using the set of modified rules.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a flow chart of an example process for processing packets using a transposed firewall policy according to an implementation described herein.

DETAILED DESCRIPTION

The following detailed description refers to the accompanying drawings. The same reference numbers in different drawings may identify the same or similar elements.

Systems and/or methods, described herein, may enable a firewall policy, hosted by a network node and which includes one or more negative rules, to be transposed, by a network device, into another firewall policy that does not include any negative rules. Transposing the firewall policy into the other firewall policy may allow the node, which cannot process and/or execute the negative rules, to process and/or filter packets, using the transposed firewall policy, as though the node was processing and/or executing the negative rules.

The firewall policy may include positive rules that identify an action that corresponds to a manner in which the packets are to be processed when conditions (e.g., specified by the positive rules) are determined to be present. The firewall policy may also include negative rules that identify another action that corresponds to another manner in which the packets are to be processed when conditions (e.g., specified by the negative rules) are determined not to be present. The node may not be able to process the negative rules associated with the firewall policy. Based on the determination that the node cannot process the negative rules, the network device may perform an operation to transpose the firewall policy to another firewall policy, which is equivalent to the firewall policy, that includes positive rules than can be executed by the node.

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
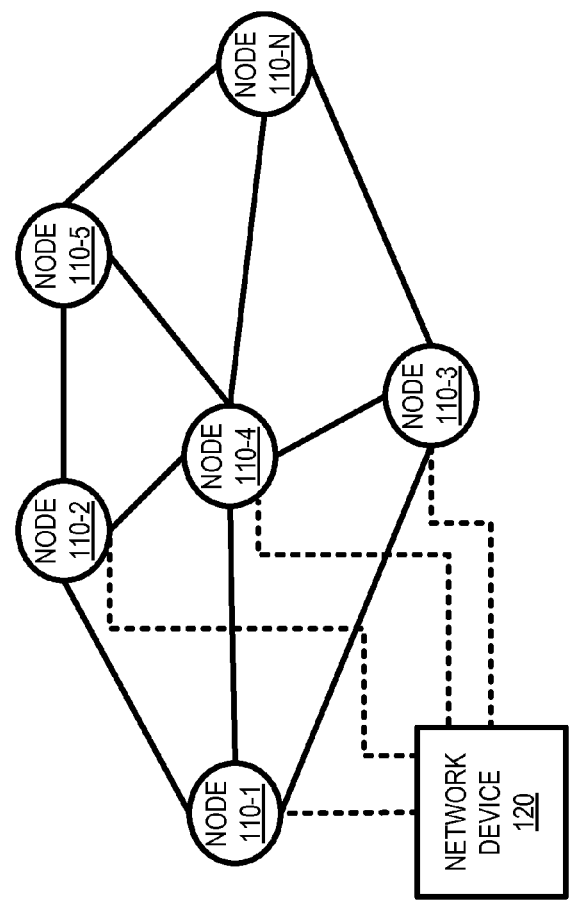
FIG. 1 is a diagram of an example network in which systems and/or methods described herein may be implemented.

FIG. 1 is a diagram of an example network 100 in which systems and/or methods described herein may be implemented. As shown in FIG. 1, network 100 may include a group of network nodes 110-1, . . . , 110-N (where N≧1) (hereinafter referred to collectively as "nodes 110" and individually as "node 110") and a network device 120. The number of nodes and/or devices, illustrated in FIG. 1, is provided for explanatory purposes only. In practice, there may be additional nodes and/or devices, fewer nodes and/or devices, different nodes and/or devices, or differently arranged nodes and/or devices than illustrated in FIG. 1. Also, in some implementations, one or more of the nodes and/or devices, of network 100, may perform one or more functions described as being performed by another one or more of the nodes and/or devices of network 100. The nodes and/or devices of network 100 may interconnect via wired connections, wireless connections, or a combination of wired and wireless connections.

Node 110 may include a network device that transmits traffic (e.g., packets). For example, node 110 may take the form of a routing device, a switching device, a multiplexing device, a firewall device, or a device that performs a combination of routing, switching, security functions, and/or multiplexing functions. In one implementation, node 110 may be a digital device. In another implementation, node 110 may be an optical device. In yet another implementation, node 110 may be a combination of a digital device and an optical device. While node 110 is described herein as including a firewall device, in other implementations, node 110 may include other devices instead of, or in combination with the firewall device.

Node 110 may include an internal or external storage device and/or memory that stores information associated with node 110 operations. In one example, node 110 may store, in the storage device and/or memory, network topology information, routing tables, and/or packet forwarding tables. Node 110 may receive, process, and/or transmit packets traversing network 100. Node 110 may add and/or append (push) information (e.g., headers, trailers, tags, etc.) to incoming and/or outgoing packets. Node 110 may remove and/or extract information from incoming and/or outgoing packets.

Node 110 (e.g., node 110-1) may perform security and/or packet processing functions based on a firewall policy that includes a set of rules that identify how packets are to be processed. The rules may identify conditions that, when satisfied by information obtained from a packet, cause node 110 to perform an act on the packet (e.g., drop the packet, process the packet, transmit the packet, etc.). In one example, a rule may be a positive rule that identifies an action to be performed on a packet when the packet includes information specified by the positive rule (e.g., a particular source address, destination address, flow information, etc.).

Node 110 may not be able to execute and/or process a negative rule included within the firewall policy. For example, the firewall policy may include a negative rule that identifies another action to be performed, on a packet, when the packet does not include particular information identified by the negative rule (e.g., a source address other than a particular source address, a destination address other than a particular destination address, etc.).

Network device 120 may include one or more server devices, or other types of computation or communication devices, that gather, process, search, store, and/or provide information in a manner described herein. Network device 120 may, in one example implementation, perform an operation to convert the firewall policy, that includes one or more negative rules, to another firewall policy, that is equivalent to the firewall policy, that does not include the negative rules. The firewall other policy, may allow node 110 to process packets, using positive rules included within the other firewall policy, as though node 110 was able to process the packets with the firewall policy that includes the negative rules. Network device 120 may transmit the other firewall policy to node 110 to be stored and/or installed (e.g., burned in) on node 110.

Network device 120 may host a policy application that is used to convert the firewall policy to the other firewall policy that does not include a negative rule. Network device 120 may, for example, use the policy application to classify each of the rules in the firewall policy as positive and/or negative. A positive rule may include one or more positive terms that identify information that is to be detected within a packet to satisfy the positive term. The positive rule may also identify a particular action to be taken (e.g., drop the packet, transport the packet, etc.). For example, a positive rule may identify a particular source address (e.g., source address=1.1.1.1, that corresponds to a first positive term), a particular destination address (e.g., destination address=2.2.2.2, that corresponds to a second positive term) and an action to be taken, by node 110, when a packet includes the particular source and destination addresses.

A negative rule may include at least one negative term and any quantity (e.g., zero, one, two, etc.) of positive terms. A negative rule may include information that is not to be detected, within a packet, to satisfy the negative term and other information that is to be detected, within the packet, to satisfy a positive term associated with the negative rule. The negative rule may also identify a particular action to be taken (e.g., drop the packet, process the packet, transport the packet, etc.) when the negative and positive terms are satisfied. For example, a negative rule may identify a particular source address (e.g., source address≠1.1.1.1, that corresponds to a first negative term), a particular destination address (e.g., destination address=2.2.2.2, that corresponds to a first positive term) and an action to be taken, by node 110, when a packet does not include the particular source address and does include the particular destination address.

Network device 120 may use the policy application to generate rules, associated with another firewall policy, that does not include any negative rules and/or terms. The policy application may generate a different set of rules for each negative term included within the firewall policy. For example, a first negative term may cause the policy application to generate a first set of rules that include a positive version of the first negative term. The first set of rules may, in another example, include one or more positive rules obtained from the firewall policy. In yet another example, the first set of rules may include a positive version of another negative term obtained from the firewall policy.

Network device 120 may use the policy application to generate a second set of rules associated with a second negative term obtained from the firewall policy. For example, the second negative term may cause the policy application to generate a second set of rules that include a positive version of the second negative term. The second set of rules may, in another example, include one or more of the positive rules obtained from the firewall policy. In yet another example, the second set of rules may include the positive version of another negative term obtained from the firewall policy.

Network device 120 may generate a transposed firewall policy based on the positive rules obtained from the firewall policy and a respective set of rules associated with each of the negative terms included within the firewall policy. Network device 120 may transmit the transposed firewall policy to node 110 to be stored and/or installed within a memory and/or storage device associated with node 110. Node 110 may use the transposed firewall policy to process packets being transported by network 100 via node 110. The transposed firewall policy may enable node 110 to process the packets as though node 110 was processing the packets using the firewall policy and/or was able to process and/or execute the negative rules included within the firewall policy.

Figure 2A:
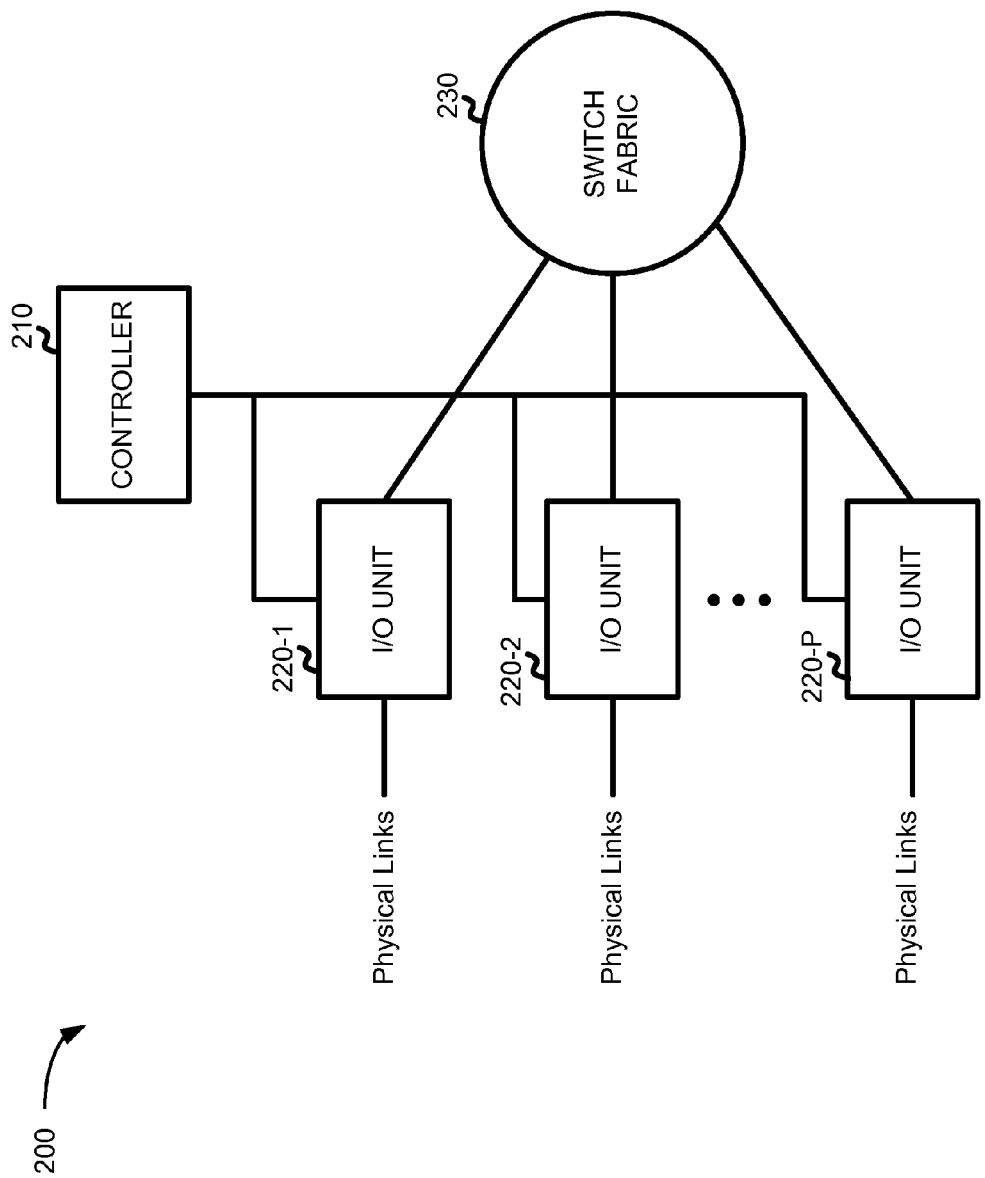
FIG. 2A is a diagram of example components of one or more network nodes of FIG. 1.

FIG. 2A is a diagram of example components of a device 200 that may correspond to node 110. Additionally, or alternatively, each node 110 may include one or more of devices 200. Device 200 may include a data transfer device, such as a router, a gateway, a switch, a firewall, a network interface card (NIC), a hub, a bridge, a proxy server, an optical add-drop multiplexer (OADM), or some other type of device that processes and/or transfers traffic.

Device 200 may include a controller 210, a set of input/output (I/O) units 220-1, 220-2, . . . , 220-P (where P≧1) (hereinafter referred to collectively as "I/O units 220" and individually as "I/O unit 220"), and a switch fabric 230. Although, FIG. 2A illustrates example components of device 200, in other implementations, device 200 may include additional components, fewer components, different components, or differently arranged components than those illustrated in FIG. 2A and described herein. Additionally, or alternatively, one or more operations described as being performed by a particular component of device 200 may be performed by one or more other components, in addition to or instead of the particular component of device 200.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high-level management functions for device 200. For example, controller 210 may maintain the connectivity and manage information/data necessary for transferring packets by device 200. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for device 200. Controller 210 may also perform other general control and monitoring functions for device 200. Controller 210 may perform operations to convert a firewall policy, that includes a negative rule, to another firewall policy that includes only positive rules for execution by node 110. Controller 210 may transmit the converted firewall policy to I/O units 220 and/or may permit I/O units 220 to access to the converted firewall policy that may allow I/O units 220 to process packets using the positive rules associated with the converted firewall policy.

I/O unit 220 may include a component or collection of components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 100). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using a forwarding table from controller 210 to determine destination information. If the destination indicates that the data should be sent out on a physical link, connected to I/O unit 220, then I/O unit 220 may prepare the data for transmission by, for example, adding any necessary headers (e.g., based on a tunneling protocol, etc.) and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may transmit the data to the other I/O unit 220 via switch fabric 230. I/O units 220 may use a converted firewall policy to process packets received and/or outputted by I/O units 220.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 2B:
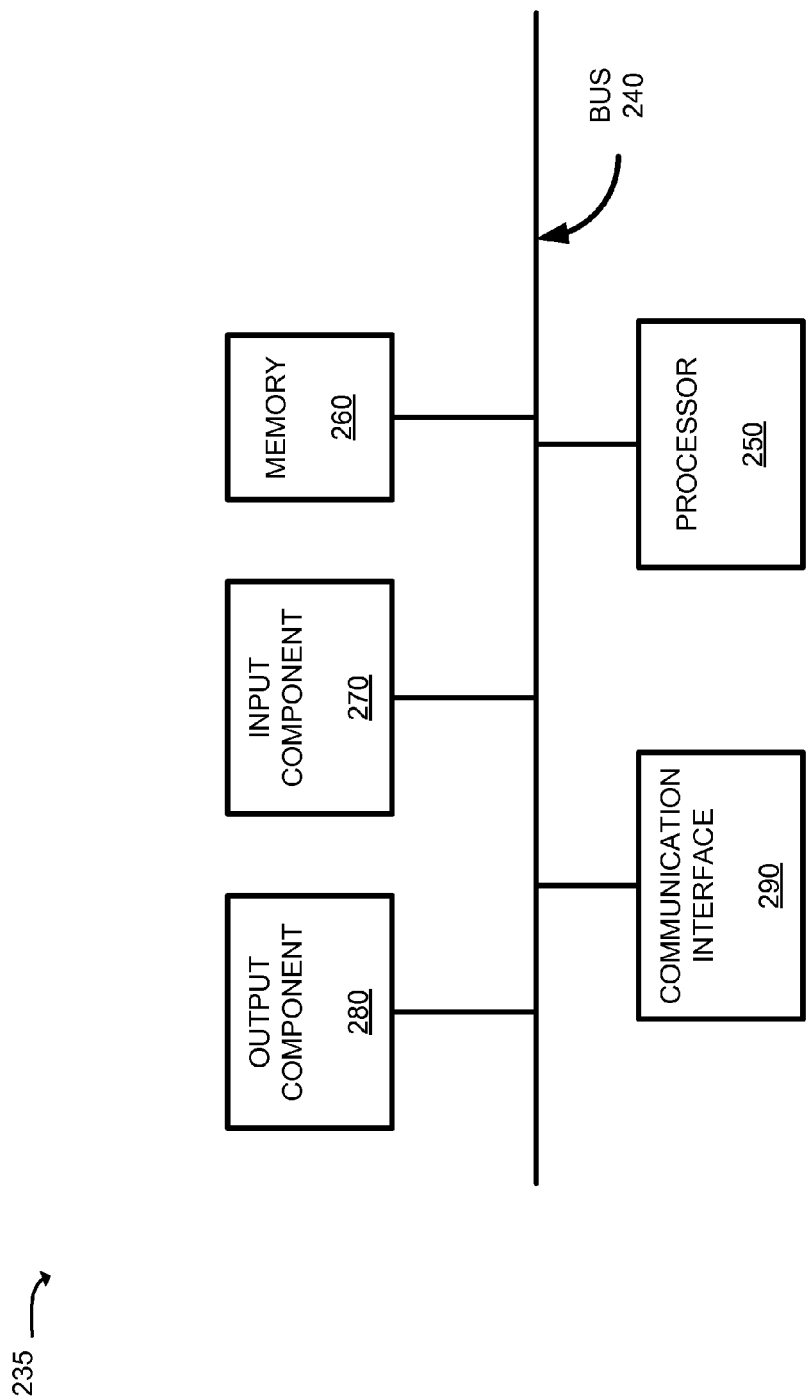
FIG. 2B is a diagram of example components of the network device of FIG. 1.

FIG. 2B is a diagram of example components of a device 235 that may correspond to network device 120. Alternatively, network device 120 may include one or more devices 235. Device 235 may include a bus 240, a processor 250, a memory 260, an input component 270, an output component 280, and a communication interface 290. Although FIG. 2B shows example components of device 235, in other implementations, device 235 may contain fewer components, additional components, different components, or differently arranged components than depicted in FIG. 2B. For example, device 235 may include one or more switch fabrics instead of, or in addition to, bus 240. Additionally, or alternatively, one or more components of device 235 may perform one or more tasks described as being performed by one or more other components of device 235.

Bus 240 may include a path that permits communication among the components of device 235. Processor 250 may include one or more processors, microprocessors, or processing logic that may interpret and execute instructions. Memory 260 may include any type of dynamic storage device that may store information and instructions, for execution by processor 250, and/or any type of non-volatile storage device that may store information for use by processor 250.

Input component 270 may include a mechanism that permits a user to input information to device 235, such as a keyboard, a keypad, a button, a switch, etc. Output component 280 may include a mechanism that outputs information to the user, such as a display, a speaker, one or more light emitting diodes (LEDs), etc. Communication interface 290 may include any transceiver-like mechanism that enables device 235 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 290 may include mechanisms for communicating with another device or system via a network, such as network 100. In one alternative implementation, communication interface 290 may be a logical component that includes input and output ports, input and output systems, and/or other input and output components that facilitate the transmission of data to other devices.

As described herein, device 235 may perform certain operations associated with transposing a firewall policy. Device 235 may perform these operations in response to processor 250 executing software instructions contained in a computer-readable medium, such as memory 260. A computer-readable medium may be defined as a non-transitory memory device. A memory device may include space within a single physical memory device or spread across multiple physical memory devices. The software instructions may be read into memory 260 from another computer-readable medium or from another device. The software instructions contained in memory 260 may cause processor 250 to perform processes described herein. Alternatively, hardwired circuitry may be used in place of or in combination with software instructions to implement processes described herein. Thus, implementations described herein are not limited to any specific combination of hardware circuitry and software.

Figure 3:
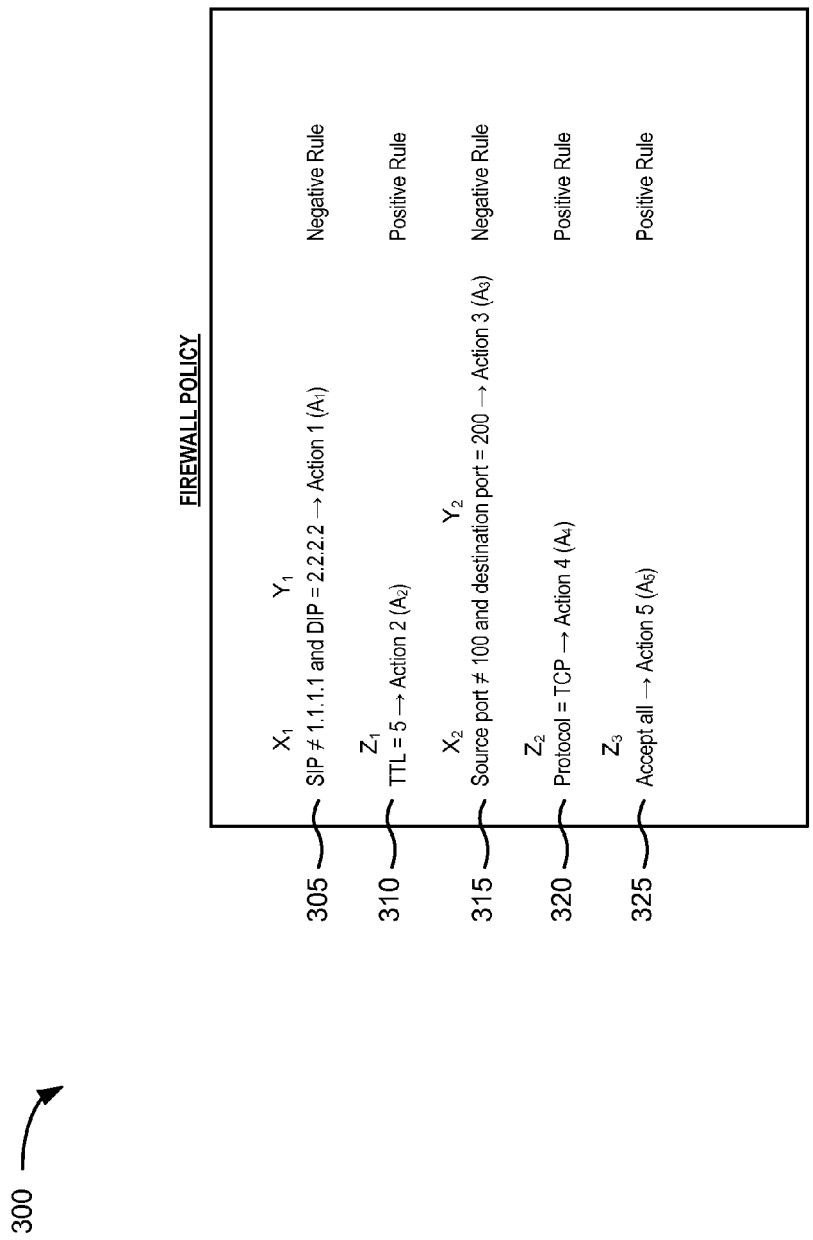
FIG. 3 is a diagram of an example firewall policy, associated with a network node of FIG. 1, that includes one or more negative rules, according to an implementation described herein.

FIG. 3 is a diagram of an example firewall policy 300 (hereinafter referred to as policy 300), associated with node 110, that includes one or more negative rules. Policy 300 may be stored in a memory and/or storage device associated with node 110 and/or network device 120. As shown in FIG. 3, policy 300 may include a collection of rules 305-325. Policy 300 includes rules 305-325 for explanatory purposes. In practice, policy 300 may include additional rules, fewer rules, different rules, or differently arranged rules than are described with respect to policy 300.

Rule 305 may correspond to a first negative rule that includes a first negative term (e.g., X1), a first positive term (e.g., Y1), and a first action (e.g., action 1 (A1)) that is to be performed when the first negative term and the first positive term are satisfied. For example, the first negative term, X1, may be satisfied when a packet, received by node 110, includes a source Internet protocol (IP) address (hereinafter referred to as "SIP") that is not equal to a particular SIP (e.g., SIP≠1.1.1.1). In another example, the first positive term, Y1, may be satisfied when the packet, received by node 110, includes a destination IP address (hereinafter referred to as "DIP") that is equal to a particular DIP (e.g., DIP=2.2.2.2). Thus, when the packet does not include the particular SIP and does include the particular DIP, node 110 may perform the first action on the packet.

Rule 310 may correspond to a first positive rule (e.g., Z1) and a second action (e.g., action 2 (A2)) that is to be performed when the first positive rule is satisfied. For example, the first positive rule, Z1, may be satisfied when a packet, received by node 110, includes a particular time-to-live (TTL) value (e.g., TTL=5). Thus, when the packet includes the particular TTL value, node 110 may perform the second action on the packet.

Rule 315 may correspond to a second negative rule that includes a second negative term (e.g., X2), a second positive term (e.g., Y2), and a third action (e.g., action 3 (A3)) that is to be performed when the second negative term and the second positive term are satisfied. For example, the second negative term, X2, may be satisfied when a packet, received by node 110, includes information associated with a source port that is different than a particular source port (e.g., source port≠100). In another example, the second positive term, Y2, may be satisfied when the packet, received by node 110, includes information associated with a particular destination port (e.g., destination port=200). Thus, when the packet does not include the information associated with the particular source port and does include the information associated with the particular destination port, node 110 may perform the third action on the packet.

Rule 320 may correspond to a second positive rule (e.g., Z2) and a fourth action (e.g., action 4 (A4)) that is to be performed when the second positive rule is satisfied. For example, the second positive rule, Z2, may be satisfied when a packet, received by node 110, corresponds to a particular protocol (e.g., protocol=transmission control protocol (TCP)). Thus, when the packet corresponds to the particular protocol, node 110 may perform the fourth action on the packet.

Rule 325 may correspond to a third positive rule (e.g., Z3) and a fifth action (e.g., action 5 (A5)) that is to be performed when the third positive rule is satisfied. For example, the third positive rule, Z3, may be satisfied by a packet that did not satisfy any of rules 305 through 320. Node 110 may, for example, perform a default action, as the fifth action (e.g., drop the packet, process the packet, transmit the packet, etc.), on the packet that does not satisfy rules 305-320.

Network device 120 may determine that policy 300 includes negative rules 305 and/or 315 and may determine that packets cannot be processed, by node 110, using policy 300. Based on the determination that policy 300 includes negative rules 305 and/or 315 and that node 110 cannot process negative rules, network device 120 may use a policy application to transpose policy 300 into another policy, which is equivalent to policy 300, that node 110 can use to process the packets. The transposed policy may include a collection of positive rules that can be executed, by node 110, to process the packets.

Figure 4A:
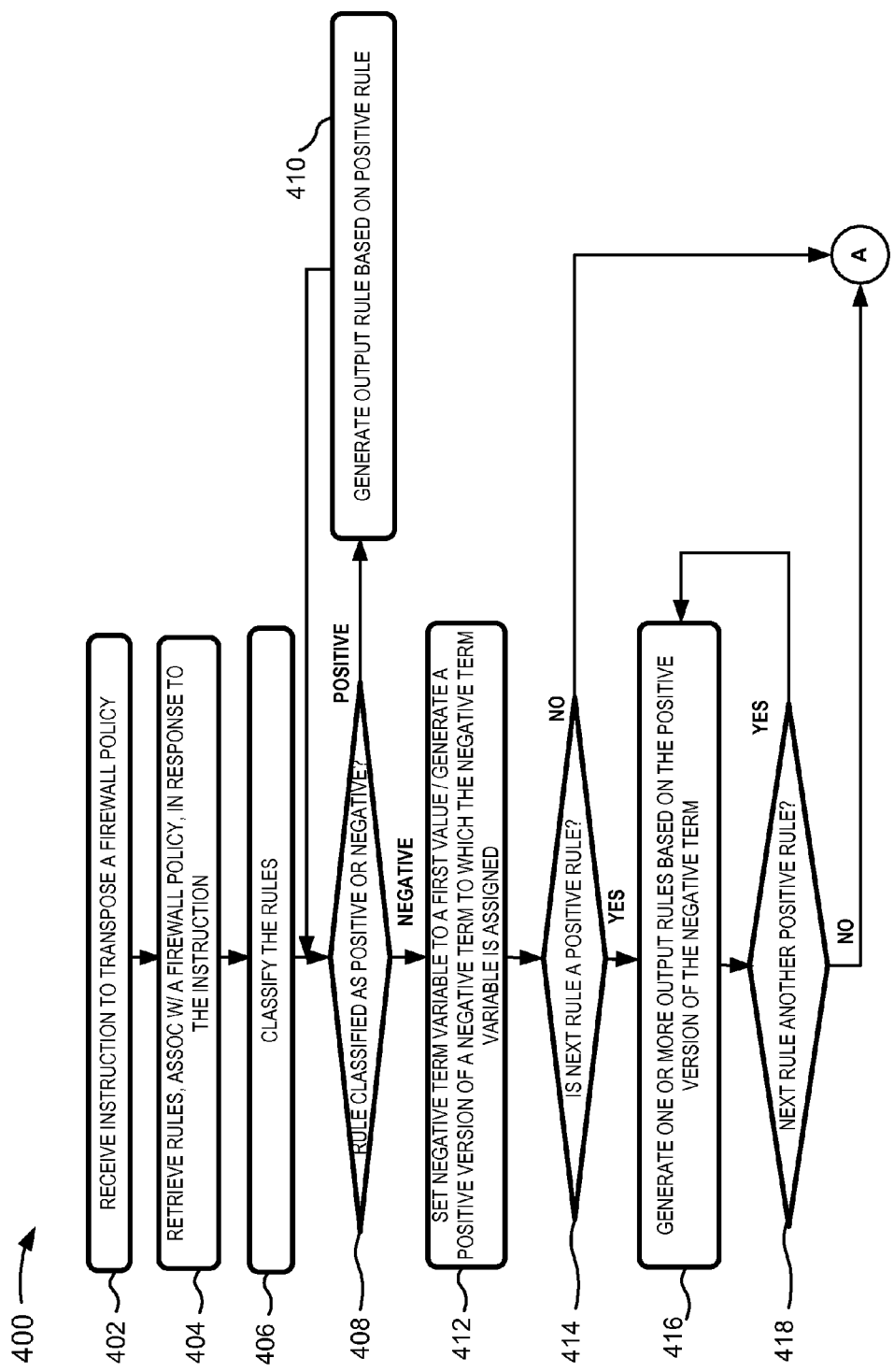
FIGS. 4A and 4B are flow charts of an example process for transposing a firewall policy, that includes one or more negative rules, to another policy that does not include any negative rules.
Figure 4B:
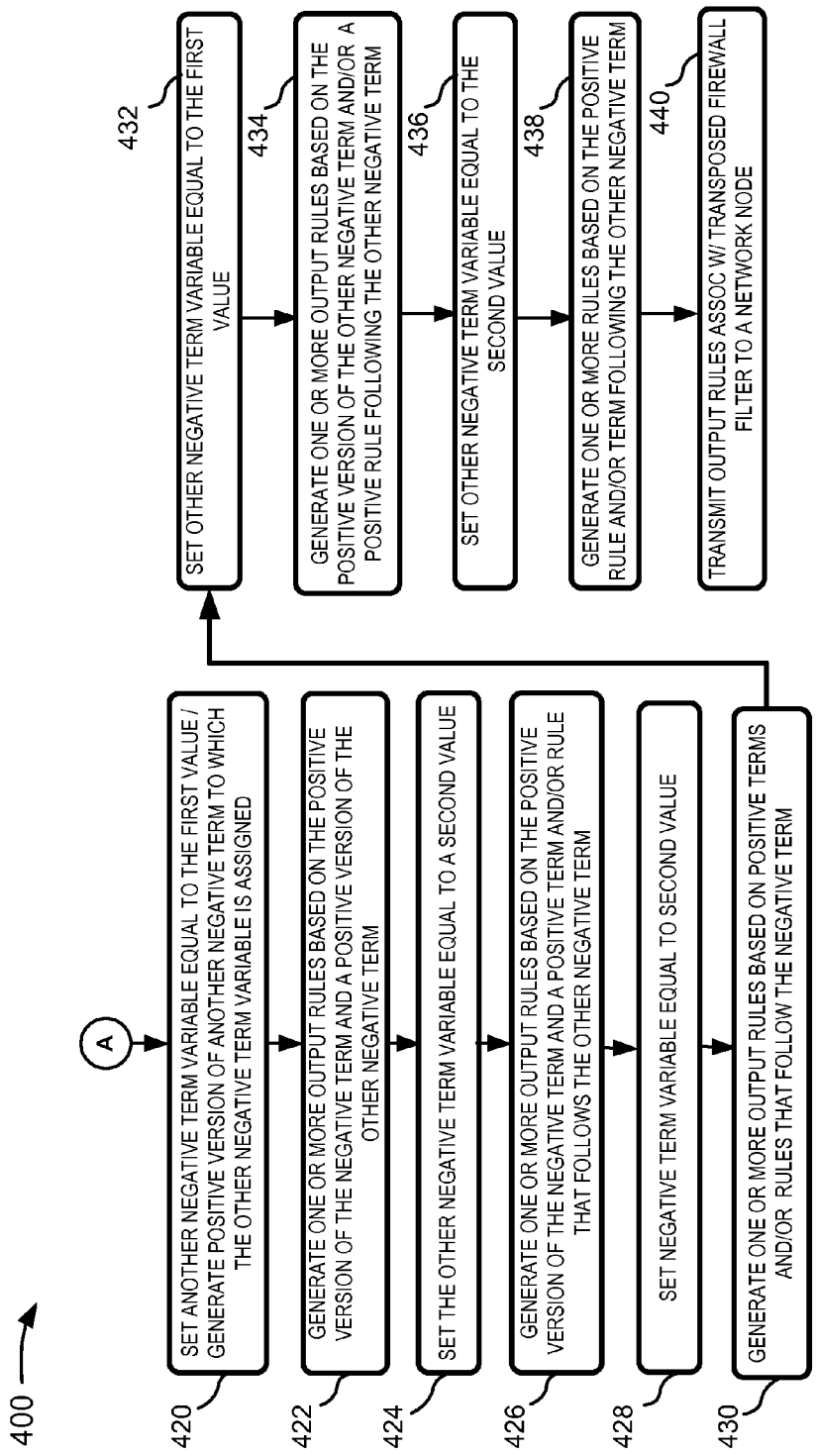

FIGS. 4A and 4B are flowcharts of an example process 400 for transposing a firewall policy, that includes one or more negative rules, to another firewall policy that does not include negative rules. In one example implementation, process 400 may be performed by network device 120. In another example implementation, some or all of process 400 may be performed by a device or collection of devices separate from, or in combination with, network device 120.

Figure 5:
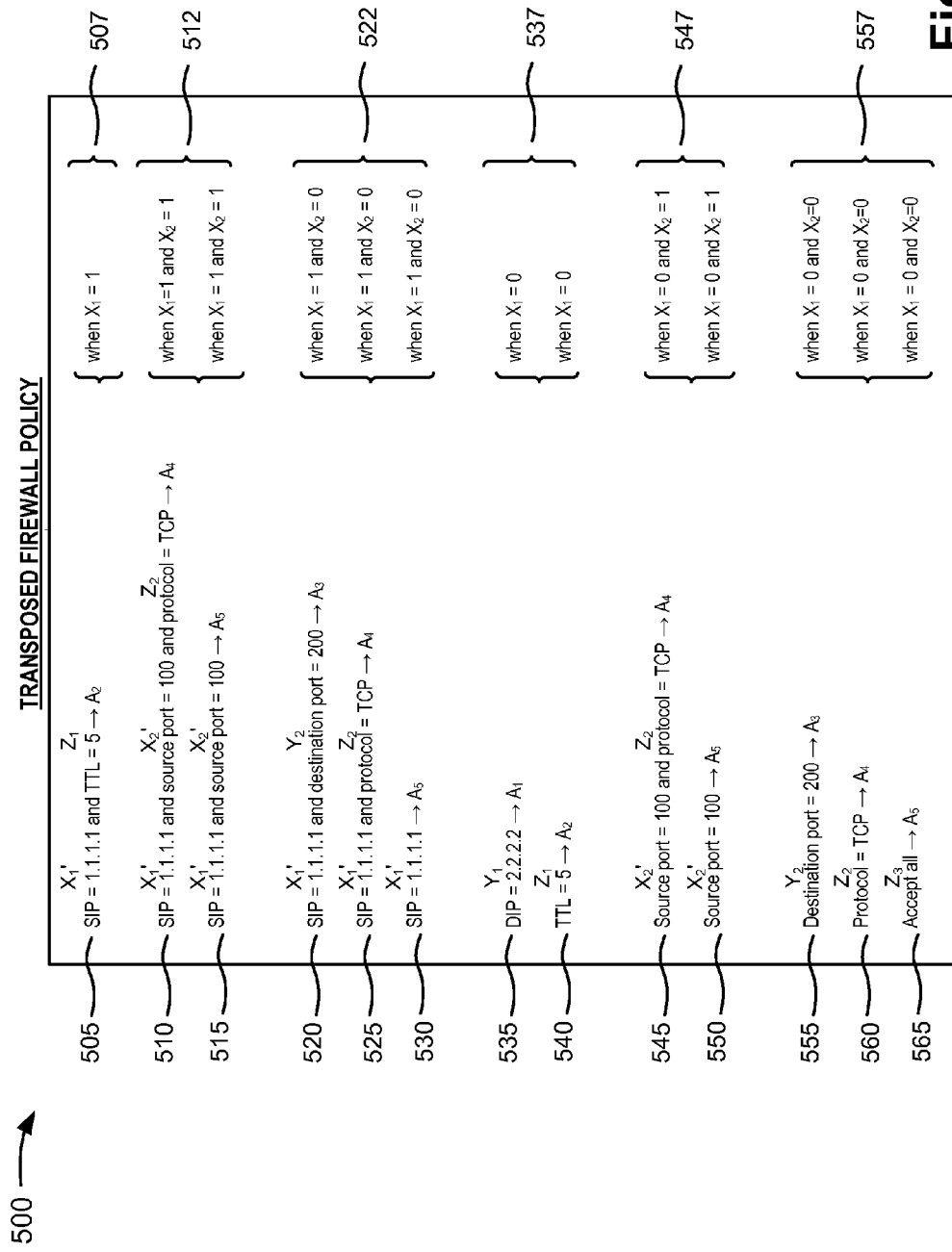
FIG. 5 is a diagram of an example transposed firewall policy, associated with a network node of FIG. 1, according to an implementation described herein.

FIG. 5 is a diagram of an example transposed firewall policy 500, associated with node 110, according to an implementation described herein. As illustrated in FIG. 5, transposed firewall policy 500 may include a collection of positive rules 505-565. A portion of process 400, of FIGS. 4A and 4B, will be discussed below with corresponding references to the positive rules 505-565, of transposed firewall policy 500, of FIG. 5.

As shown in FIG. 4A, process 400 may include receiving an instruction to transpose a firewall policy (block 402) and retrieving rules associated with the firewall policy (block 404). For example, network device 120 may receive an instruction to transpose a firewall policy associated with node 110 and may, in response to the instruction, retrieve rules, associated with the firewall policy (e.g., such as firewall policy 300 of FIG. 3). The rules, associated with the firewall policy, may include one or more negative rules and one or more positive rules.

As also shown in FIG. 4A, process 400 may include classifying the rules (block 406). For example, network device 120 may use a policy application to classify each rule, within the firewall policy, as a positive rule or a negative rule. Network device 120 may, in a manner similar to that described above with respect to FIG. 3, classify each positive rule by assigning a positive rule variable (e.g., $Z_M$, where $M \geq 1$) to each positive rule (e.g., by assigning $Z_1$ to a first positive rule, $Z_2$ to a second positive rule, etc.).

In another example, network device 120 may, in a manner similar to that described above with respect to FIG. 3, classify each negative rule, within the firewall policy, by assigning a negative term variable (e.g., $X_K$, where $K \geq 1$) to each negative term (e.g., by assigning $X_1$ to a first negative term, $X_2$ to a second negative term, etc.) included within the negative rules. Network device 120 may also classify each positive term, included within the negative rules, by assigning a positive term variable (e.g., $Y_L$, where $L \geq 1$) to each positive term (e.g., by assigning $Y_1$ to a first positive term, $Y_2$ to a second positive term, etc.). Network device 120 may classify an action, associated with each rule within the firewall policy, by assigning an action variable (e.g., $A_P$, where $P \geq 1$) to each action (e.g., by assigning $A_1$ to a first action associated with a first rule, $A_2$ to a second action associated with a second rule, etc.).

Network device 120 may identify a quantity of positive terms and/or rules based on a quantity of rules and/or terms that are classified as positive terms and/or positive rules (e.g., based on a quantity of terms assigned $Y_L$ and/or a quantity of rules assigned $Z_M$). Network device 120 may also identify a quantity of negative terms based on a quantity of terms that are classified as negative terms (e.g., a quantity of terms assigned $X_K$). Network device 120 may use the quantity of negative terms to identify a quantity of processing cycles and/or nested loops to be used to convert the rules associated with the firewall policy, to positive rules associated with a transposed firewall policy that can be executed by node 110. In one example, if one negative term (e.g., to which a first negative term variable (e.g., $X_1$) is assigned) is identified, then network device 120 may generate the transposed firewall policy based on two processing cycles: a first cycle when the first negative term variable is set to a first value (e.g., when $X_1=1$ or some other value) and a second cycle when the first negative term variable is set to a second value (e.g., when $X_1=0$ or some other value).

In another example, if two negative terms (e.g., to which a first negative term variable (e.g., $X_1$) and a second negative term variable (e.g., $X_2$), respectively, are assigned) are identified, then network device 120 may generate the transposed firewall policy based on four processing cycles. For example, a first cycle may generate a first set of positive output rules when the first negative term variable is set to the first value (e.g., $X_1=1$) and the second negative term variable is set to the second value (e.g., (e.g., $X_2=0$). A second cycle may generate a second set of positive output rules when the first negative term variable is set to the first value (e.g., $X_1=1$) and the second negative term is set to the first value (e.g., $X_2=1$). A third cycle may generate a third set of positive output rules when the first negative term variable is set to the second value (e.g., $X_1=0$) and the second negative term variable is set to the first value (e.g., $X_2=1$). A fourth cycle may generate a fourth set of positive output rules when the first negative term variable is set to the second value (e.g., $X_1=0$) and the second negative term variable is set to the second value (e.g., $X_2=0$). In yet another example, if three negative terms are identified, network device 120 may, in a manner similar to that described above, use up to eight processing cycles to generate the positive output rules associated with the transposed firewall policy.

If the rule is classified as a positive rule (block 408—POSITIVE), then process 400 may include generating an output rule based on the positive rule (block 410). For example, network device 120 may use the policy application to determine that a first rule, within the firewall policy, has been classified as a positive rule based on a positive rule variable (e.g., $Z_M$) assigned to the positive rule. Network device 120 may generate an output rule (e.g., a rule to be included in a transposed firewall policy) that is based on the positive rule and an action associated with the positive rule. Network device 120 may determine whether a next rule, within the firewall policy, is classified as another positive rule (block 408). Network device 120 may generate another output rule that is based on the other positive rule and another action, associated with the other positive rule (block 410).

If the rule is classified as a negative rule (block 408—NEGATIVE), then process 400 may include setting a negative term variable equal to a first value and generating a positive version of the negative term to which the negative term variable is assigned (block 412). For example, network device 120 may determine that a rule, within the firewall policy, has been classified as a negative rule (e.g., such as negative rule 305 of FIG. 3) based on a determination that a first negative term variable (e.g., $X_1$) was assigned to the negative rule. The negative rule may, for example, include the first negative term (e.g., SIP≠1.1.1.1 as shown in FIG. 3) to which the first negative term variable was assigned.

Network device 120 may set the first negative term variable equal to a first value (e.g., $X_1=1$) to generate one or more output rules associated with the first negative term and/or any positive rules that follow the first negative term and/or precede a second negative term. As a result of setting the first negative term variable to the first value, network device 120 may generate a positive version of the first negative term (e.g., such as, when SIP=1.1.1.1).

If the next rule is a positive rule (block 414—YES), then process 400 may include generating an output rule based on the positive version of the negative term (block 416). For example, network device 120 may determine that a next rule, that follows the first negative rule, within the firewall policy, has been classified as a first positive rule (e.g., such as positive rule 310, where TTL=5→$A_2$, as shown in FIG. 3) based on a determination that the next rule has been assigned a positive rule variable (e.g., $Z_1$).

Network device 120 may generate an output rule, to be included in a transposed firewall policy, based on the positive version of the first negative term, the first positive rule, and/or an action (e.g., $A_2$) that corresponds to the first positive rule. For example, as shown in FIG. 5, rule 505 (e.g., SIP=1.1.1.1 and TTL=5→$A_2$) may include the positive version of the first negative term (e.g., associated with $X_1$'), the first positive rule (e.g., associated with $Z_1$), and the action that corresponds to the first positive rule (e.g., $A_2$). As also shown in FIG. 5, rule 505 may correspond to the first negative term variable being set equal to the first value (e.g., $X_1=1$ as shown within brackets 507).

Returning to FIG. 4A, if the next rule is another positive rule (block 418—YES), then process 400 may include generating another output rule based on the positive version of the negative term (block 416). For example, network device 120 may, in a manner similar to that described above (e.g., with respect to block 414—YES), determine that another positive rule, within the firewall policy, follows the positive rule and/or precedes the second negative term. Network device 120 may generate another output rule based on the positive version of the first negative rule, the other positive rule, and another action that corresponds to the other positive rule.

If the next rule is not a positive rule (block 414—NO) or if the next rule is not another positive rule (block 418—NO), then process 400 may include setting another negative term variable equal to the first value and generating a positive version of another negative term to which the other negative term variable is assigned (block 420 of FIG. 4B). For example, network device 120 may determine that a next rule, within the firewall policy, has been classified as another negative rule (e.g., such as negative rule 315 of FIG. 3) based on a determination that a second negative term variable (e.g., $X_2$) was assigned to the other negative term. The other negative rule may, for example, include the second negative term (e.g., source port≠100 as shown in FIG. 3) to which the second negative term variable was assigned.

For example, network device 120 may set the second negative term variable (e.g., $X_2$) equal to the first value (e.g., where $X_1$=1 and $X_2$=1, respectively) to generate one or more output rules derived from the first negative term, the second negative term, and/or any positive rules that follow the second negative term. As a result of setting the second negative term variable equal to the first value, network device 120 may generate a positive version of the second negative term (e.g., source port=100).

As further shown in FIG. 4B, process 400 may include generating one or more output rules based on the positive version of the negative term and a positive version of the other negative term (block 422). For example, network device 120 may determine that a next rule, that follows the second negative rule, within the firewall policy, has been classified as a second positive rule (e.g., such as positive rule 320, where protocol=TCP→$A_4$, as shown in FIG. 3) based on a determination that the next rule has been assigned a second positive rule variable (e.g., $Z_2$).

Network device 120 may generate an output rule, to be included in the transposed firewall policy, based on the positive version of the first negative term, the positive version of the second negative term, the second positive rule, and/or an action (e.g., $A_4$) that corresponds to the second positive rule. For example, as shown in FIG. 5, rule 510 (e.g., SIP=1.1.1.1 and source port=100 and protocol=TCP→$A_4$) may include the positive version of the first negative term (e.g., associated with $X_1$'), the positive version of the second negative term (e.g., associated with $X_2$'), the second positive rule (e.g., associated with $Z_2$), and the action that corresponds to the second positive rule (e.g., $A_4$). As also shown in FIG. 5, rule 510 may correspond to the first and second negative term variables being set equal to the first value (e.g., $X_1$=1 and $X_2$=1 as shown within brackets 512).

Network device 120 may also generate another output rule, based on the first and second negative term variables being set equal to the first value. For example, if network device 120 determined that another positive rule follows the second positive rule, then network device 120 may generate another output rule based on the positive version of the first negative term, the positive version of the second negative term, the other positive rule, etc.

In another example, if network device 120 determines that the other positive rule does not follow the second positive rule, network device 120 may generate another output rule, to be included in the transposed firewall policy, based on the positive version of the first negative term and/or the positive version of the second negative term. For example, as shown in FIG. 5, rule 515 (e.g., SIP=1.1.1.1 and source port=100→$A_5$) may include the positive version of the first negative term (e.g., associated with $X_1$') and the positive version of the second negative term (e.g., associated with $X_2$') and an action (e.g., associated with $A_5$) to be performed when the terms of rule 515 are satisfied. The action may correspond to a default action (e.g., accept all packets and/or some other action that corresponds to rule 325 of FIG. 3), to be performed by node 110, when the terms of rule 515 are satisfied.

Returning to FIG. 4, network device 120 may determine whether there are further negative terms (e.g., $X_3$, $X_4$, etc.) included within the firewall policy to determine whether additional processing cycles and/or loops are to be performed. Based on a determination that a further negative term is included in the firewall policy, network device 120 may, in a manner similar to that described above with respect to block 420, set a further negative term variable to the first value (e.g., where $X_1$=1, $X_2$=1, and $X_3$=1) and may generate a positive version of the further negative term to which the further negative variable is assigned. Network device 120 may use the positive version of the further negative term to generate output rules in a manner similar to that described above with respect to block 422. Network device 120 may also set the further negative term variable to a second value (e.g., where $X_1$=1, $X_2$=1, and $X_3$=0) and may generate other output rules based on positive terms and/or rules, within the firewall policy, that follow the further negative term. The other output rules may include a positive version of the negative term and/or the other negative term and may not include the positive version of the further negative term.

As further shown in FIG. 4B, process 400 may include setting the other negative term variable to a second value (block 424) and generating one or more output rules based on the positive version of the negative term and a positive term and/or rule that follows the other negative term (block 426). For example, network device 120 may set the second negative term variable (e.g., $X_2$) equal to a second value (e.g., where $X_1$=1 and $X_2$=0, respectively). Setting the second negative term variable to the second value may allow network device 120 to generate one or more output rules associated with the first negative term, and/or any positive terms and/or positive rules, associated with the firewall policy, that follow the second negative term.

For example, network device 120 may determine that a next term, that follows the second negative term, associated with the second negative rule, has been classified as a second positive term (e.g., such as positive term $Y_2$ of negative rule 315, of FIG. 3, where destination port=200→$A_3$,). Network device 120 may generate an output rule, to be included in the transposed firewall policy, based on the positive version of the first negative term, the second positive term, and/or an action (e.g., $A_3$) that corresponds to the second positive term. For example, as shown in FIG. 5, rule 520 (e.g., SIP=1.1.1.1 and destination port=200→$A_3$) may include the positive version of the first negative term (e.g., associated with $X_1$'), the second positive term (e.g., associated with $Y_2$), and/or the action that corresponds to the second negative term (e.g., $A_3$). As also shown in FIG. 5, rule 520 may correspond to the first negative term variable being set equal to the first value and the second negative term variable being set to the second value (e.g., $X_1$=1 and $X_2$=0 as shown within brackets 522).

Network device 120 may also generate another output rule, as a result of the first negative term variable being set equal to the first value and the second negative term variable being set to the second value. For example, network device 120 may determine that a second positive rule (e.g., associated with $Z_2$) follows the second negative rule and network device 120 may generate another output rule based on the positive version of the first negative term, the second positive rule, and an action associated with the second positive rule. For example, as shown in FIG. 5, rule 525 (e.g., SIP=1.1.1.1 and protocol=TCP→$A_4$) may include the positive version of the first negative term (e.g., associated with $X_1'$) and the second positive rule (e.g., associated with $Z_2$), and/or an action (e.g., associated with $A_4$), associated with the second positive rule, to be performed when the terms of rule 525 are satisfied.

Network device 120 may determine that other positive terms and/or rules, that occur after the second negative term, do not exist within the firewall policy and may generate a further output rule that includes the positive version of the first negative term. The further output rule, as shown by rule 530 (FIG. 5) may include the positive version of the first negative term and a default action (e.g., accept all packets and/or some other action that corresponds to rule 325 of FIG. 3).

Returning to FIG. 4B, network device 120 may determine whether there are further negative terms (e.g., $X_3$, $X_4$, etc.) included within the firewall policy to determine whether additional processing cycles and/or loops are to be performed. Based on a determination that a further negative term is included in the firewall policy, network device 120 may, in a manner similar to that described above with respect to block 420, set a further negative term variable to the first value (e.g., where $X_1=1$, $X_2=0$, and $X_3=1$) and may generate a positive version of the further negative term to which the further negative variable is assigned. Network device 120 may use the positive version of the further negative term to generate output rules in a manner similar to that described above with respect to block 426. Network device 120 may also set the further negative term variable to a second value (e.g., where $X_1=1$, $X_2=0$, and $X_3=0$) and may generate other output rules based on positive terms and/or rules, within the firewall policy, that follow the further negative term. The other output rules may include positive version of the negative term and may not include the other negative term and/or the positive version of the further negative term.

As still further shown in FIG. 4B, process 400 may include setting the negative term variable to the second value (block 428) and generating one or more output rules based on the positive terms and/or rules that follow the negative term (block 430). For example, network device 120 may set the first negative term variable (e.g., $X_1$) equal to the second value (e.g., where $X_1=0$) to generate one or more output rules associated a positive term and/or rule, associated with the firewall policy (e.g., firewall policy 300 of FIG. 3) that occurs after the first negative term and/or before the second negative rule. The output rules, that are generated as a result of the negative term variable being set to the second value, may not be based on a positive version of the first negative term.

For example, network device 120 may determine that a next term, that follows the first negative term has been classified as a first positive term (e.g., such as positive term $Y_1$ of negative rule 305, of FIG. 3, where DIP=2.2.2.2→$A_1$,). Network device 120 may generate an output rule, to be included in the transposed firewall policy, based on the first positive term and/or an action (e.g., $A_1$) that corresponds to the first positive term. For example, as shown in FIG. 5, rule 535 (e.g., DIP=2.2.2.2→$A_1$) may include the first positive term (e.g., associated with $Y_1$) and/or the action that corresponds to the first positive term (e.g., $A_1$). As also shown in FIG. 5, rule 535 may correspond to the first negative term variable being set equal to the second value (e.g., $X_1=0$ as shown within brackets 537).

In another example, network device 120 may determine that a rule, that follows the first negative term, has been classified as a first positive rule (e.g., such as positive rule $Z_1$ of positive rule 310, of FIG. 3, where TTL=5→$A_2$). Network device 120 may generate an output rule, to be included in the transposed firewall policy, based on the first positive rule which includes an action (e.g., $A_2$) to be performed when the rule is satisfied. As shown in FIG. 5, rule 540 (e.g., TTL=5→$A_2$) may include the first positive term (e.g., associated with $Y_1$) and/or the action that corresponds to the first positive term (e.g., $A_1$).

As also shown in FIG. 4B, process 400 may include setting the other negative term variable equal to the first value (block 432) and generating one or more output rules based on the positive version of the other negative term and/or a positive rule following the other negative term (block 434). For example, network device 120 may set the second negative term variable (e.g., $X_2$) equal to the first value (e.g., where $X_1=0$ and $X_2=1$). Network device 120 may generate a positive version of the other negative term as a result of setting the second negative term variable equal to the first value. Network device 120 may also generate one or more output rules, to be included in a transposed firewall policy, as a result of setting the second negative term variable equal to the first value. The output rules may include the positive version of the second negative term (e.g., source port=100) and/or a positive rule that follows the other negative term.

For example, network device 120 may determine that a rule, that follows the second negative term, has been classified as a second positive rule (e.g., such as positive rule $Z_2$ of positive rule 320, of FIG. 3, where protocol=TCP→$A_4$). Network device 120 may generate an output rule, to be included in the transposed firewall policy, based on the positive version of the second negative term and the second positive rule which includes an action (e.g., $A_4$) to be performed when the rule is satisfied. As shown in FIG. 5, rule 545 (e.g., source port=100 and protocol=TCP→$A_4$) may include the positive version of the second negative term (e.g., associated with $X_2'$), the second positive rule (e.g., associated with $Z_2$) and/or the action that corresponds to the second positive rule (e.g., $A_4$). As also shown in FIG. 5, rule 545 may correspond to the first negative term variable being set to the second value and the second negative term variable being set equal to the first value (e.g., $X_1=0$ and $X_2=1$ as shown within brackets 547).

In another example, network device 120 may determine that no other positive rule follows the second negative term and may generate another output rule that includes the positive version of the second negative term. The further output rule, as shown by rule 550 (FIG. 5) may include the positive version of the second negative term and a default action (e.g., accept all packets and/or some other action that corresponds to rule 325 of FIG. 3).

Network device 120 may determine whether there are further negative terms (e.g., $X_3$, $X_4$, etc.) included within the firewall policy. Based on a determination that a further negative term is included in the firewall policy, network device 120 may, in a manner similar to that described above with respect to block 420, set a further negative term variable to the first value (e.g., where $X_1=0$, $X_2=1$, and $X_3=1$) and may generate output rules in a manner similar to that described above with respect to block 422. Network device 120 may also set the further negative term variable to a second value (e.g., where $X_1=0$, $X_2=1$, and $X_3=0$) and may generate other output rules in a manner similar to that described above with respect to block 426.

As further shown in FIG. 4B, process 400 may include setting the other negative term variable equal to the second value (block 436) and generating one or more output rules based on a positive rule and/or term that follows the second negative term (block 438). For example, network device 120 may set the second negative term variable (e.g., $X_2$) equal to the second value (e.g., where $X_1=0$ and $X_2=0$). Setting the second negative term variable equal to the second value may allow network device 120 to generate one or more output rules based on any positive terms and/or rules, within the firewall policy, that follow the second negative term.

For example, network device 120 may determine that a next term, that follows the second negative term, has been classified as a second positive term (e.g., such as positive term $Y_2$ of negative rule 315, of FIG. 3, where destination port=200→$A_3$,). Network device 120 may generate an output rule, to be included in the transposed firewall policy, based on the second positive term and/or an action (e.g., $A_3$) that corresponds to the second positive term. For example, as shown in FIG. 5, rule 555 (e.g., destination port=200→$A_3$) may include the second positive term (e.g., associated with $Y_2$), and/or the action that corresponds to the second negative term (e.g., $A_3$). As also shown in FIG. 5, rule 555 may correspond to the first negative term variable and the second negative term variable being set to the second value (e.g., $X_1=0$ and $X_2=0$ as shown within brackets 557).

Network device 120 may also generate another output rule, as a result of the second negative term variable being set equal to the second value. For example, network device 120 may determined that a second positive rule (e.g., associated with $Z_2$) follows the second negative rule and network device 120 may generate another output rule based on the second positive rule and/or an action associated with the second positive rule. For example, as shown in FIG. 5, rule 560 (e.g., protocol=TCP→$A_4$) may include the second positive rule (e.g., associated with $Z_2$) and/or an action (e.g., associated with $A_4$), associated with the second positive rule.

Network device 120 may also generate a further output rule, as a result of the second negative term variable being set equal to the second value. For example, network device 120 may determined that a third positive rule (e.g., associated with $Z_3$) follows the second negative rule and network device 120 may generate a further output rule based on the third positive rule and/or an action associated with the third positive rule. For example, as shown in FIG. 5, rule 565 (e.g., accept all→$A_5$) may include the third positive rule (e.g., associated with $Z_3$) and/or an action (e.g., associated with $A_5$), associated with the third positive rule. The action may correspond to a default action (e.g., accept all packets and/or some other action that corresponds to rule 325 of FIG. 3).

Network device 120 may determine that other positive terms and/or rules, that occur after the second negative term, do not exist within the firewall policy and may generate a further output rule that includes the positive version of the first negative term. The further output rule, as shown by rule 530 (FIG. 5) may include the positive version of the first negative term and a default action (e.g., accept all packets and/or some other action that corresponds to rule 325 of FIG. 3).

Network device 120 may determine whether there are further negative terms (e.g., $X_3$, $X_4$, etc.) included within the firewall policy. Based on a determination that a further negative term is included in the firewall policy, network device 120 may, in a manner similar to that described above with respect to block 420, set a further negative term variable to the first value (e.g., where $X_1=0$, $X_2=0$, and $X_3=1$) and may generate output rules in a manner similar to that described above with respect to block 422. Network device 120 may also set the further negative term variable to a second value (e.g., where $X_1=0$, $X_2=0$, and $X_3=0$) and may generate other output rules in a manner similar to that described above with respect to block 426.

As yet further shown in FIG. 4B, process 400 may include transmitting the output rules, as the transposed firewall policy, to a network node (block 440). For example, network device 120 may determine that no other negative terms are included in the firewall and/or that all rules and/or terms have been processed by the policy application. Based on the determination that no other negative terms are included within the firewall policy and/or that all rules and/or terms have been processed, network device 120 may transmit the output rules, as the transposed firewall policy, to node 110 to be installed and/or stored on node 110. Node 110 may receive the transposed firewall policy and may store the transposed firewall policy in a memory and/or storage device associated with node 110. In another example, network device 120 may cause the transposed firewall policy to be installed (e.g., burned in) in node 110 that allows node 110 to process packets using the transposed firewall policy.

FIG. 6 is a flow chart of an example process 600 for processing packets using a transposed firewall policy according to an implementation described herein. In one example implementation, process 600 may be performed by node 110. In another example implementation, some or all of process 600 may be performed by a device or collection of devices separate from, or in combination with, node 110.

As shown in FIG. 6, process 600 may include receiving a packet (block 605) and retrieving a transposed firewall policy in response to receiving the packet (block 610). For example, node 110 may receive a packet being transported over network 100. Node 110 may, in response to receiving the packet, obtain rules, associated with a transposed firewall policy (e.g., such as transposed firewall policy 500 of FIG. 5).

As also shown in FIG. 6, process 600 may include processing the packet based on the rules obtained from the transposed firewall policy (block 615). For example, node 110 may obtain information from the packet, such as a source address (e.g., a SIP), a TTL associated with the packet, an indication of a source port via which the packet was received, an indication of a destination port via which the packet is to be transmitted to a destination address (e.g., a DIP), information associated with a protocol (e.g., TCP, IP, etc.) with which the packet is being transmitted, etc. Node 110 may determine whether the information, obtained from the packet, satisfies terms associated with a rule, which may cause node 110 to perform an action that corresponds to the rule.

In one example, node 110 may determine that the information associated with the packet includes a particular SIP (e.g., 1.1.1.1), identifies a destination port via which the packet is to transported (e.g., 300) and is being transported based on a particular protocol (e.g., TCP). Based on the information associated with the packet, node 110 may determine that the first rule (e.g., rule 505 of FIG. 5) is not to be enforced because the packet does not include a particular TTL (e.g., TTL=5) identified by the first rule. Node 110 may determine that a second rule and/or third rule (e.g., rules 510 and/or 515, of FIG. 5, respectively) are not to be enforced because the packet was not received via a particular source port (e.g., source port=100). Node 110 may determine that a fourth rule (e.g., rule 520 of FIG. 5) is not to be enforced because the destination port (e.g., 300) identified by the packet does not match the destination port (e.g., 200) specified by the fourth rule. Node 110 may enforce a fifth rule (e.g., rule 525) based on a determination that the particular SIP matches a SIP specified by the fifth rule and/or a particular protocol matches a protocol specified by the fifth rule. Node 110 may perform an operation on the packet that corresponds to the action (e.g., $A_4$) specified by the fifth rule. The operation may indicate that the packet is to be blocked and/or dropped, transmitted, delayed, transmitted using a particular protocol, etc. Node 110 may process other packets using the rules obtained from the transposed firewall policy in a manner similar to that described above.

Systems and/or methods, described herein, may enable a firewall policy, hosted by a network node and which includes one or more negative rules, to be transposed, by a network device, into another firewall policy that is equivalent to the firewall policy, and that does not include any negative rules. The systems and/or methods may allow the transposed firewall policy to be installed in the network node. Installing the transposed firewall policy, in the network node, may enable the network node, which cannot process and/or execute the negative rules, to process packets, using the transposed firewall policy, as though the network node was processing and/or executing the negative rules.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 4A, 4B, and 6, the order of the blocks may be modified in other implementations. Further, non-dependent blocks may be performed in parallel. Additionally the rules and/or policies, of FIGS. 3 and 5, are merely examples that are provided for explanatory purposes only. In other implementations, a variety of other rules and/or policies may be used.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, a plurality of rules, associated with a policy, that specify how packets are to be processed by a node,
   the plurality of rules including:
      one or more negative rules that identify operations to be performed, by the node, when information, obtained from the packets, does not match information specified by the one or more negative rules, and
      one or more positive rules that identify other operations to be performed, by the node, when the information, obtained from the packets, matches information specified by the one or more positive rules;
   determining, by the device, a classification of the plurality of rules;
   identifying, by the device, the one or more negative rules based on the classification of the plurality of rules;
   assigning, by the device, a first variable to a first negative term associated with the one or more negative rules;
   setting, by the device, the first variable equal to a first value that allows a first positive rule to be generated;
   generating, by the device and based on the first variable being set equal to the first value, a plurality of modified rules based on the one or more negative rules,
      the plurality of modified rules including the first positive rule, and
      the first positive rule including a positive version of the first negative term; and
   installing the plurality of modified rules in the node to allow the node to process the packets by using the plurality of modified rules.

2. The method of claim 1, further comprising:
   assigning a second variable to a second negative term associated with the one or more negative rules; and
   setting the second variable equal to a second value that allows a second positive rule, of the plurality of modified rules, to be generated,
      the second positive rule including at least a positive version of the second negative term.

3. The method of claim 2, where generating the plurality of modified rules includes:
   generating, based on the first variable being set equal to the first value, the first positive rule,
   generating, based on the second variable being set equal to the second value, the second positive rule, and
   generating a third positive rule, of the plurality of modified rules, based on a positive version of the second negative term.

4. A system comprising:
   one or more processing devices to:
      receive a plurality of rules, associated with a policy, that specify a manner in which packets are to be processed by a node,
      classify the plurality of rules to identify one or more negative rules and one or more positive rules,
         the one or more negative rules identifying one or more operations to be performed, on the packets, when information, obtained from the packets, does not match one or more conditions specified by the one or more negative rules, and
         the one or more positive rules identifying other operations to be performed, by the node, when the information, obtained from the packets, matches conditions specified by the one or more positive rules, identify a particular rule that occurs, within the plurality of rules, after a first negative term and before a second negative term, convert the first negative term to a positive version of the first negative term, convert the second negative term to a positive version of the second negative term, generate a first positive rule, of a plurality of positive rules, based on the positive version of the first negative term, generate a second positive rule, of the plurality of positive rules, based on the positive version of the first negative term and the particular rule, generate a third positive rule, of the plurality of positive rules, based on the positive version of the first negative term and the positive version of the second negative term, generate a fourth positive rule, of the plurality of positive rules, based on the positive version of the second negative term, and install the plurality of positive rules, in the node, that allows the node to process the packets as though the node was processing the packets by using the plurality of rules.

5. The system of claim 4, where the node acts as a firewall that determines whether to permit or deny transmission of the packets based on the plurality of positive rules.

6. The system of claim 4, where the positive version of the first negative term includes a condition that causes the node to perform an operation on a packet of the packets.

7. The system of claim 4, where the one or more processing devices are further to:

identify a quantity of negative terms included within the plurality of rules, and identify a quantity of processing cycles to be used to generate the plurality of positive rules based on the quantity of negative terms.

8. The system of claim 4, where the one or more processing devices are further to:

identify the first negative term within the plurality of rules before identifying the particular rule.

9. The system of claim 4, where the first positive rule identifies a first operation to be performed on a packet of the packets, where the second positive rule identifies a second operation to be performed on the packet, and where the first operation corresponds to the second operation.

10. A non-transitory computer-readable medium storing instructions, the instructions comprising:

one or more instructions that, when executed by at least one processor, cause the at least one processor to:

receive a plurality of rules that are associated with a policy that specifies how packets are to be processed by a node, the plurality of rules including one or more negative rules and one or more positive rules, the one or more negative rules identifying operations to be performed, by the node, when information, associated with the packets, does not match information specified by the one or more negative rules, and the one or more positive rules identifying other operations to be performed, by the node, when the information, obtained from the packets, matches information specified by the one or more positive rules;

identify, within the one or more negative rules, one or more negative terms and one or more positive terms;

modify the one or more negative terms to create one or more modified negative terms;

generate a first positive rule, of a plurality of modified rules, based on at least one of the one or more modified negative terms;

generate a second positive rule, of the plurality of modified rules, based on at least one of the one or more modified negative terms or at least one of the one or more positive rules;

generate a third positive rule, of the plurality of modified rules, based at least one of the one or more modified negative terms or at least one of the one or more positive terms; and transmit the plurality of modified rules to the node.

11. The non-transitory computer-readable medium of claim 10, where the node installs the plurality of modified rules and processes the packets by executing at least one of the plurality of modified rules.

12. The non-transitory computer-readable medium of claim 10, where the first positive rule identifies a first operation, to be performed by the node, that corresponds to a default operation that is identified in a particular rule of the plurality of rules, where the second positive rule identifies a second operation, to be performed by the node, that is identified in the one or more positive rules, and where the third positive rule identifies a third operation, to be performed by the node, that is identified in the one or more positive terms.

* * * * *